United States Patent
Bhola et al.

(10) Patent No.: US 6,321,252 B1
(45) Date of Patent: Nov. 20, 2001

(54) SYSTEM AND METHOD FOR DATA STREAMING AND SYNCHRONIZATION IN MULTIMEDIA GROUPWARE APPLICATIONS

(75) Inventors: Sumeer Bhola, White Plains, NY (US); Srinivas Prasad Doddapaneni, Emmaus, PA (US); Bodhistattwa Mukherjee, Wappingers Falls, NY (US); Keeranoor Ganapathy Kumar, Randolph, NJ (US); Marc Hubert Willebeek-LeMair, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/118,517

(22) Filed: Jul. 17, 1998

(51) Int. Cl.[7] .................................................. G06F 13/00
(52) U.S. Cl. ......................... 709/204; 345/330; 370/260
(58) Field of Search ........................... 709/204; 345/330, 345/331, 332; 370/260

(56) References Cited

U.S. PATENT DOCUMENTS 5,675,511 * 10/1997 Prasad et al. ........................ 345/302
5,867,799 * 2/1999 Lang et al. ............................... 707/1

* cited by examiner

*Primary Examiner*—Kenneth R. Coulter
(74) *Attorney, Agent, or Firm*—Wayne L. Ellenbogen; Anne Vachon Dougherty

(57) ABSTRACT

A system and method for temporal synchronization of media streams in multimedia collaborative applications (i.e., a multi-user distributed applications used for interaction, both in the synchronous and asynchronous fashion among a group of users) in a wide-area distributed environment. The invention presents two abstractions; event streams and collaboration space, that together provide for coarse-grained temporal synchronization by using separate streams for different media and synchronizing the streams at the client location. VCR-like controls are also provided on groups of components in a collaborative application. The event stream provides many services such as replication, persistence, buffering, reading, and writing to archive. By implementing simple interfaces, existing collaborative applications, media players, and encoders become components that can be used to build complex multimedia collaborative applications. To efficiently implement a seeking function on a data component, the present invention introduces a framework for application-specific updates to a component state.

23 Claims, 13 Drawing Sheets

REPLICATE AN EVENT STREAM

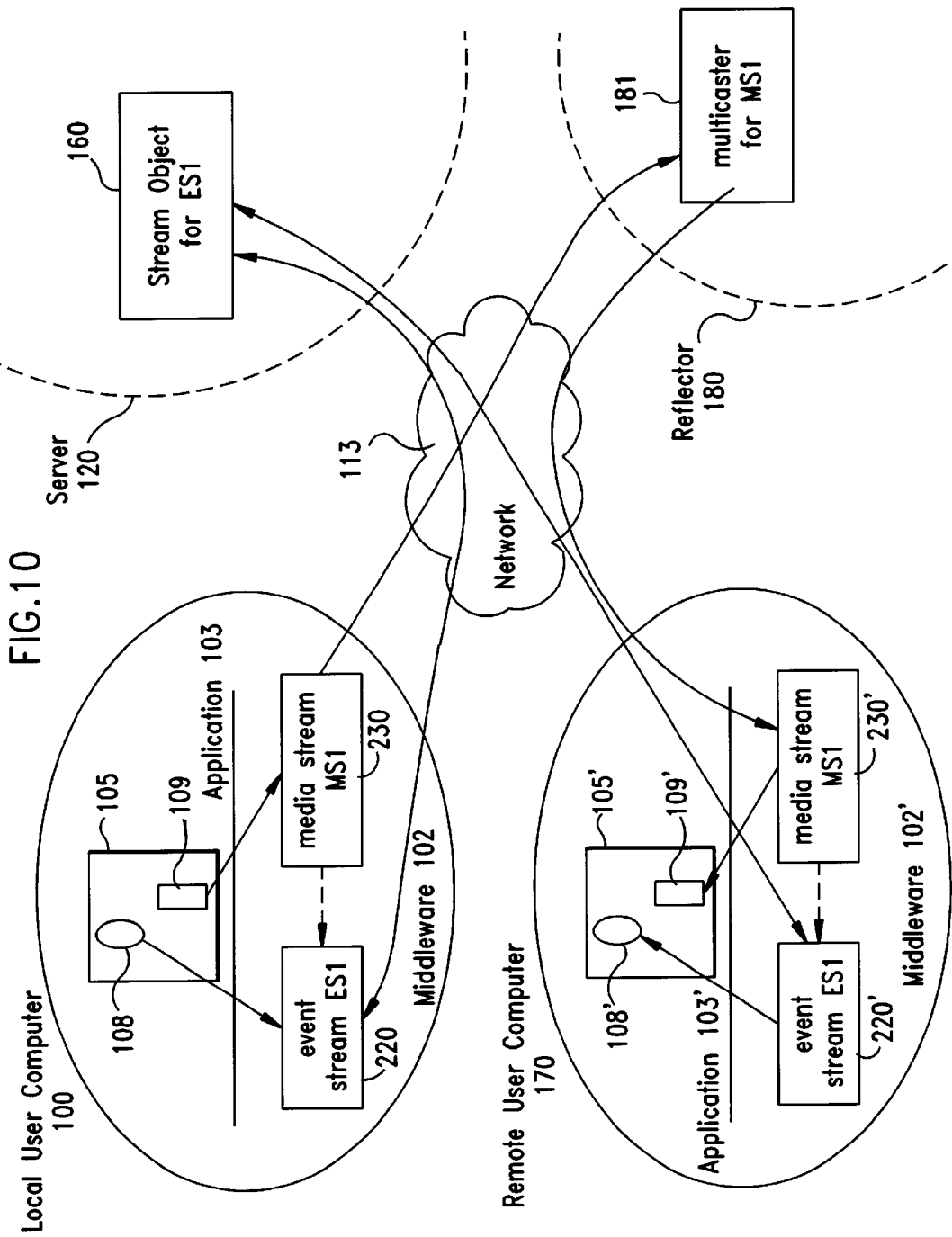

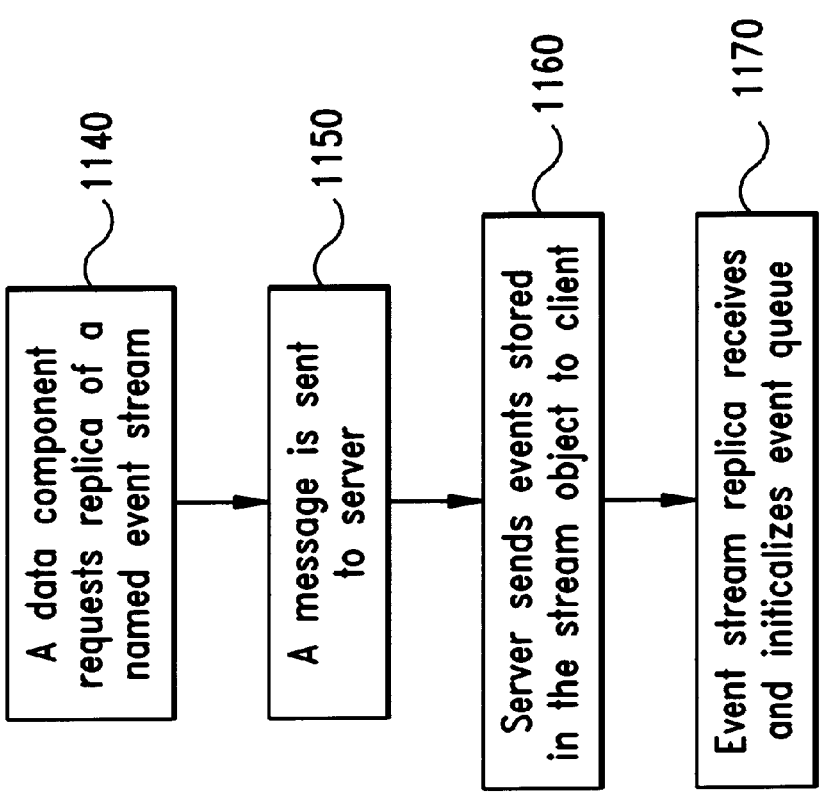

FIG.11b
REPLICATE AN EVENT STREAM

A data component requests replica of a named event stream — 1140 → A message is sent to server — 1150 → Server sends events stored in the stream object to client — 1160 → Event stream replica receives and initializes event queue — 1170

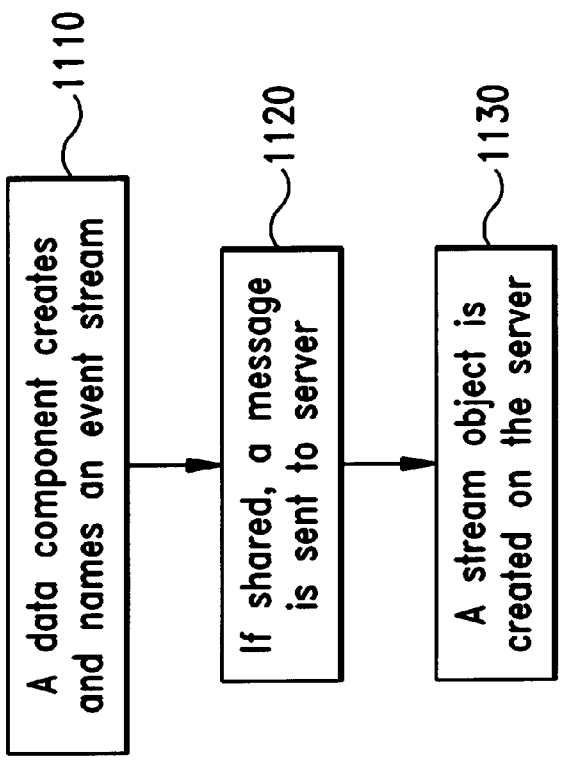

FIG.11a
CREATE AN EVENT STREAM

A data component creates and names an event stream — 1110 → If shared, a message is sent to server — 1120 → A stream object is created on the server — 1130

STREAM SYNCHRONIZATION

EVENT POST AND RECEIVE

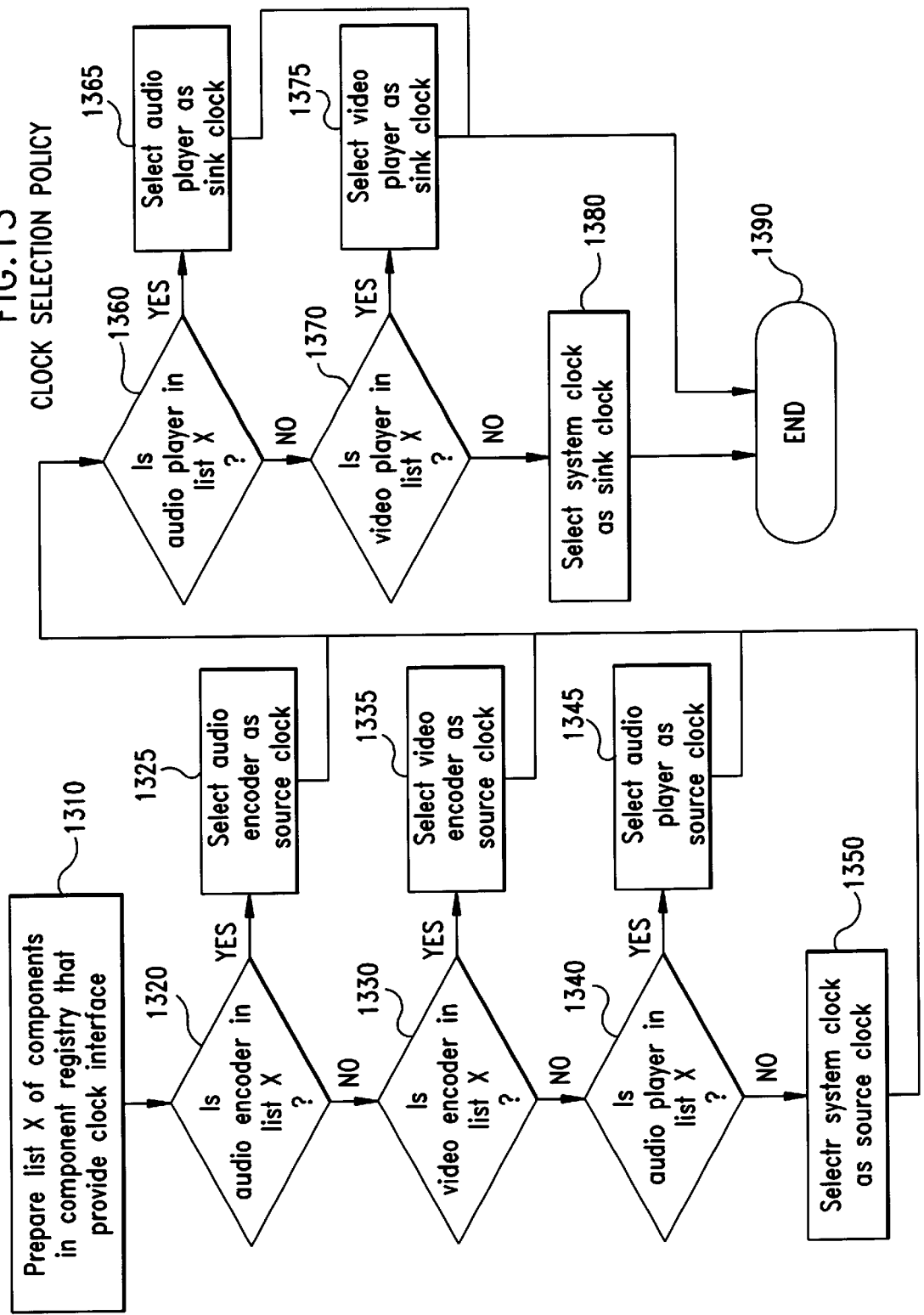

SYSTEM AND METHOD FOR DATA STREAMING AND SYNCHRONIZATION IN MULTIMEDIA GROUPWARE APPLICATIONS

FIELD OF THE INVENTION

The invention relates generally to computer software, and in particular to multimedia distributed groupware systems for concurrent interaction of a group of geographically distributed people that are connected to a common server using a computer network. More specifically, this invention relates to a method and system for providing support for temporal synchronization among various media streams and VCR-like control on application components required for building object oriented multimedia collaborative applications in wide-area distributed environments such as the Internet.

BACKGROUND OF THE INVENTION

With the popularity of the Internet, collaborative (a.k.a., groupware) applications are being used by millions of people every day to meet and interact in cyberspace. Such interactions not only complement traditional means of collaboration, but are also often used as a preferred means of interaction. For example, e-mail is accepted as a preferred mode of communication over traditional telephone calling for many situations.

Two categories of collaborations exist, asynchronous and synchronous. Asynchronous collaborative applications, which do not require collaborators to be available simultaneously, include electronic mail and web browsing. Simple synchronous collaborative applications such as chat rooms and whiteboards, have been available for a long time and are widely used by an increasing number of users over the Internet. Since these simple applications do not require support for audio or video, they can be easily developed using the state sharing and event sharing abstractions provided by most infrastructures for collaborative applications.

Prior art works have addressed the issue of stream synchronization during playback or presentation time. Nelson Manohar, et al, in an article entitled "The Session Capture and Replay Paradigm for Asynchronous Collaboration" from "The Proceedings of the European Conference on Computer-Supported Cooperative Work", pp 149–164 (September 1995), describes a system for recording a multimedia session of one collaborator to later be viewed and modified by another collaborator. A session consists of continuous media streams and discrete media streams all originating from a single user. A recorded session can be played back in the workspace of another user at a later point in time, with the system providing synchronization of streams during playback. However, existing solutions do not address those situations in which the streams are generated and consumed in real time in a multi-user collaborative setting. In such situations, there is an additional problem of maintaining consistency of replicas of shared streams given the existence of simultaneous multiple sources to an event stream. Traditional replica consistency schemes impose consistent order on the updates made to a replicated object. What is needed is a novel integration of replica consistency and stream synchronization. Another challenge in such systems is the need to provide a seek capability to "seek to" a point or transaction on a previously-provided stream. The aforementioned Manohar, et al system implements its seek capability on discrete media streams using a fast re-execution of data in the stream from the beginning to the seek point. It is desirable to provide an improved and efficient seek capability that requires re-execution of only a portion of the data.

Further, there are many interesting and useful collaborative applications such as ones for foil presentation, call center, and expert consultation, that require support for different media components (e.g., data, audio and video). These applications need middleware support for synchronizing media streams, as the latency of various streams can vary significantly. For example, in a typical foil presentation application, where a presenter shows a sequence of annotated foils accompanied with audio and/or video to a distributed group of attendees connected via the Internet, it is important that a specific foil and the corresponding annotation be displayed on a participant's screen at the same point in time as when the participant receives the audio and video describing the displayed foil. It is also desirable, therefore, to address issues related to multimedia collaboration.

The most common approach to implementing synchronization of media streams involves multiplexing the different streams into a single transport stream. A receiver demultiplexes the single transport stream, into different media streams, then feeds the streams to the corresponding players. There are several drawbacks to this approach. First, the prior art approach requires that the system use its own custom streaming protocol. As a result, the available and popular streaming technologies cannot be utilized. Second, the prior art approach makes the less communication less efficient. It is desirable to use multiple transport protocols so that noncontinuous data that is critical for the integrity of the applications can be sent using a reliable transport protocol; whereas continuous media streams can be sent using an unreliable transport protocol. For example, in a multimedia foil (a.k.a., transparency) presentation application, it is usually acceptable to drop a few packets in the audio stream. However, dropping data which encodes information synchronized to a foil can result in a mismatch between the foil displayed and the audio played at the remote client location. Thus, multiplexing the streams into one stream forces the use of a protocol that is less than ideally suited for its transport. Third, the sources of the streams for multimedia presentations are generally physically different machines. For example, in a foil presentation, a presenter can use a laptop for foils and the whiteboard and a different machine for capturing and encoding audio and video. Multiplexing streams generated by different machines can be difficult if not impossible. Moreover, the existing approaches require a globally synchronized clock which is difficult to maintain.

In addition to media synchronization, an infrastructure for multimedia collaboration must provide a powerful programming framework and a set of application programming interfaces (APIs) which an application developer can easily use to develop complex applications that include multimedia components. The infrastructure should ideally provide support for (1) archiving and replaying live collaborations, and (2) VCR-like controls (play, pause, seek, rewind etc.) in a live or archived collaboration.

Finally, it is desirable to enable existing data sharing components to work synchronously with other media streams in a complex application. For example, it would be desirable to extend an existing stand-alone foil viewer application for use in a multimedia foil presentation application here foil displays are synchronized with an audio presentation. Also, with an improved streaming technology in use, the foil viewer component should not need changes.

It is therefore an objective of the present invention to provide a novel integration of replica consistency and stream synchronization in collaborative environments.

It is another objective of the invention to imbue a collaborative system with an efficient seek capability that requires re-execution of only a portion of the data.

Yet another objective of the invention is to provide for synchronization of multimedia presentations wherein the most efficient transport protocol can be employed for each component stream.

Still another objective of the invention is to provide multimedia synchronization without requiring a globally synchronized clock.

A further objective of the invention is to provide an infrastructure for multimedia collaboration which includes a programming framework and APIs including support for VCR-like controls.

Another objective of the present invention is to implement the foregoing wherein existing material can be incorporated into a synchronized multimedia presentation.

SUMMARY OF THE INVENTION

The foregoing and the other objectives are realized by the present invention which provides a system and method for temporal synchronization of media streams in multimedia collaborative applications (i.e., a multi-user distributed application used for interaction, both in a synchronous and an asynchronous fashion, among a group of people) in a wide-area distributed environment. The invention presents two abstractions, event streams and collaboration space, that together provide for coarse-grain temporal synchronization, by using separate streams for different media and synchronizing them at the client, and provide VCR-like controls on group of components in a collaborative application. The event stream provides many services such as replication, persistence, buffering, reading and writing to archive. By implementing simple interfaces, existing collaborative applications, media players and encoders become components that can be used to build complex multimedia collaborative applications. To efficiently implement a seeking function on a data component, the present invention introduces a framework for application-specific updates to a component state.

BRIEF DESCRIPTION OF THE INVENTION

The invention will now be described in greater detail with reference to the appended drawings wherein;

FIG. 10 illustrates a system and event stream flow therein in accordance with the present invention;

Figure 12B:
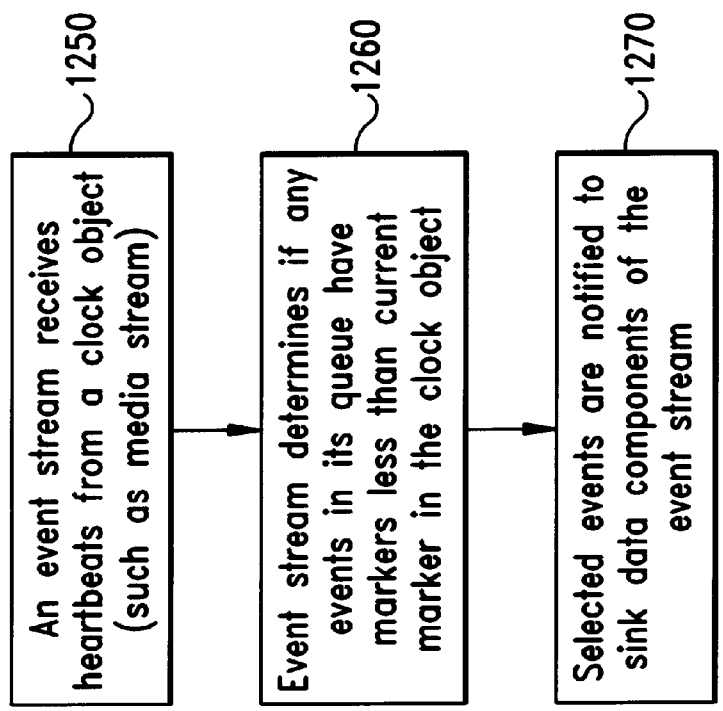
Figure 12A:
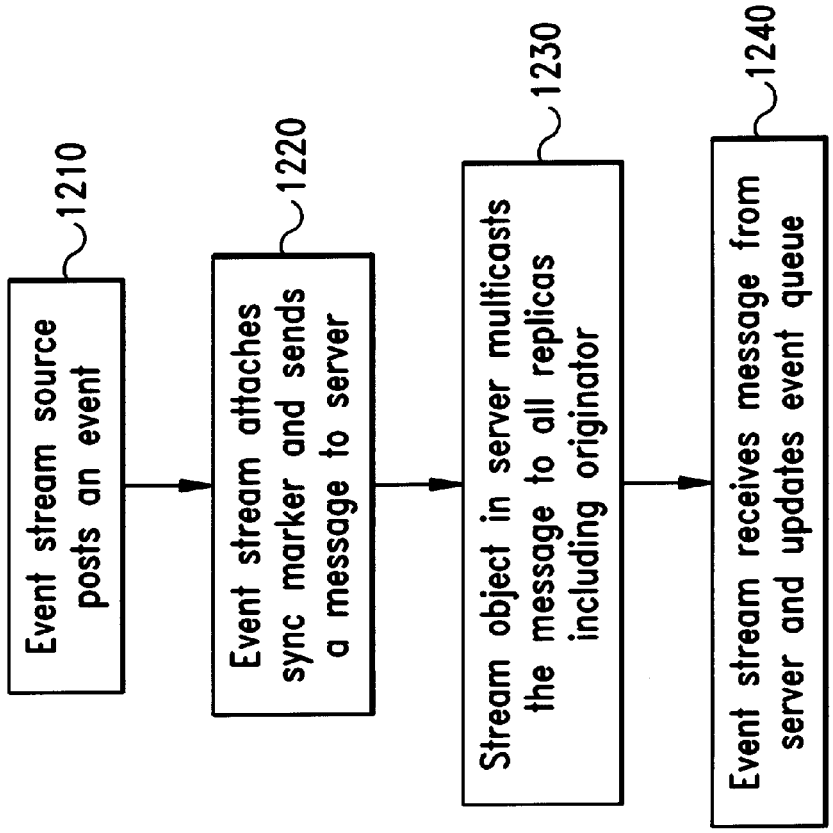

FIGS. 11(a) and 11(b) provide process flows for creating and replicating event streams;

FIGS. 12(a) and 12(b) provide process flows for posting events and for stream synchronization; and FIG. 13 depicts a flow chart for clock selection in accordance with the present invention.

DETAILED DESCRIPTION

Figure 1:
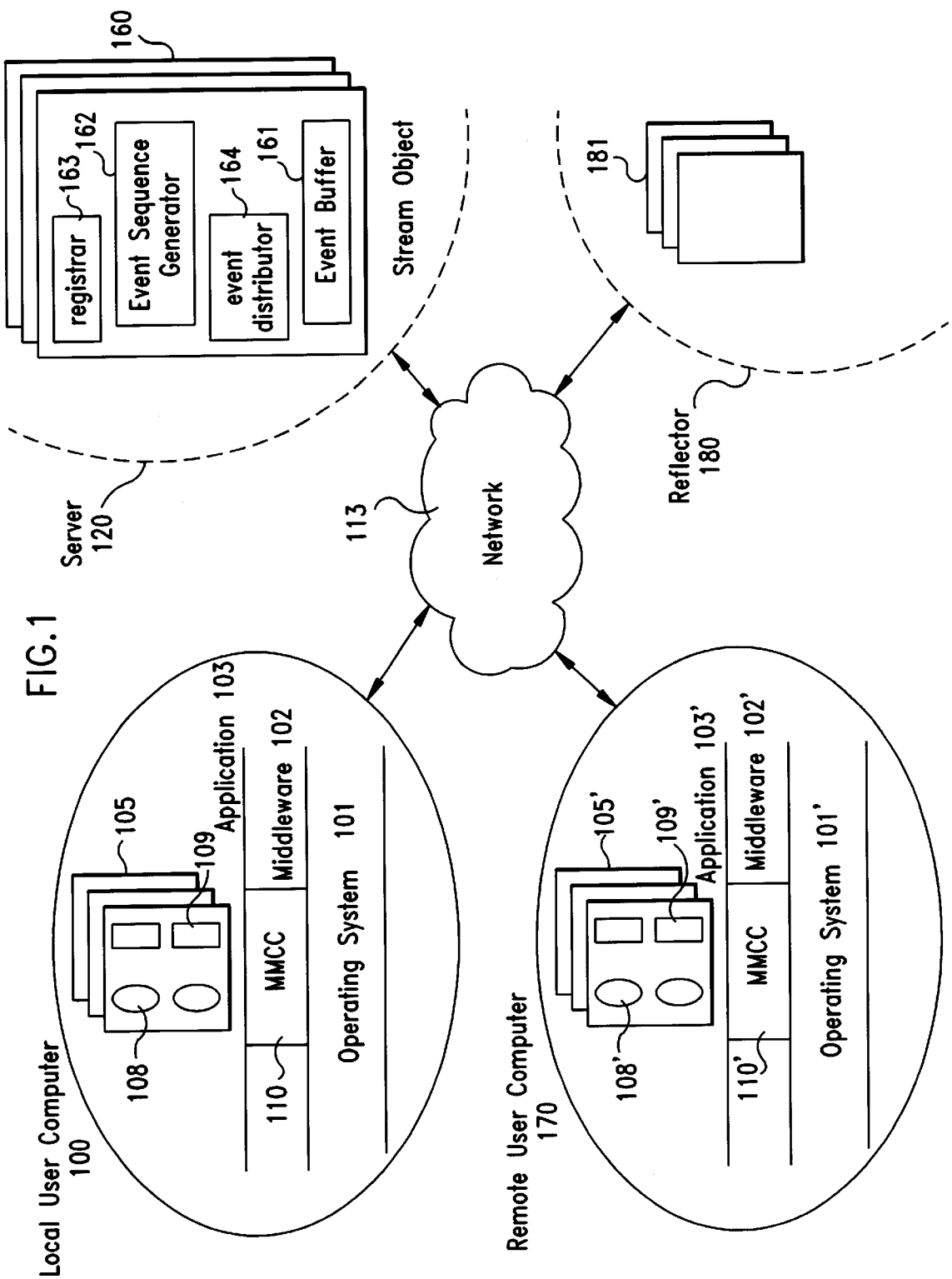
FIG. 1 depicts a system having features of the present invention.

FIG. 1 depicts an example of a system having features of the present invention including a local client site 100, one or more remote client sites 170, a server 120, and a reflector 180, all connected using a network 113. The reflector 180 is a logical server that receives one or more media streams, from one or more clients, and multicasts them to all clients. The network is used to communicate messages between the clients and the server using a network specific protocol. As an example, when the Internet is used as the network, the TCP/IP protocol is used for communication.

FIG. 10 depicts a simple example that illustrates use of the inventive system having an event stream ES1 220 and a media stream MS1 230. Source components 108, 109 for both of the streams 220, 230 are in the local user computer 100. Sink components 108', 109' of the streams are in the remote user computer 170. Updates to event stream ES1 220 are communicated to a stream object 160 on the server 120. The stream object 160 communicates updates to the replicas 220' in both local and remote users computers. Media component 109 in the local user computer acts as a source to media stream MS1 230 which sends data in the media stream to a multicaster 181 in the reflector 180. The multicaster 181, in turn, sends data to media stream MS1 230' in the remote user computer 170. Media stream MS1 230' in the remote user computer 170 notifies media component 109' after receiving data from the reflector. Event stream ES1 220' in remote user computer 170 notifies data component 108' after receiving an event from stream object 160.

FIG. 11(a) shows the steps involved in creating an event stream. An event stream is created, at step 1110, by a data component which specifies a unique name for it within the system. If the event steam is to be shared with data components in remote user computers, then a message is sent, at 1120, to the server 120 which creates, at step 1130, a stream object 160 and associates it with the event stream 220.

FIG. 11 (b) shows the steps involved in replicating an event stream that has already been created following the steps described for FIG. 11 (a). A data component 108' requests a replica of an event stream 220 by giving its name at step 1140. Next a message is sent, at 1150, to the server 120 requesting replication. As a result, the associated stream object 160 in the server 120 sends the current state of the event stream and registers the replica for notification of updates at step 1160. The replica of event stream 220 receives the current state from the server and initializes its event queue at step 1170.

FIG. 12(a) shows the steps involved in posting and receiving events from an event stream 220. A source data component 108 posts an event, at 1210, by calling the post method of the event steam 220. The event stream 220 attaches a sync marker to the event and communicates the event and sync marker to the associated stream object 160 in the server 120 at step 1220. At 1230, the stream object in the server 120 then attaches a sequence number to the event and multicasts it to all replicas, including the original event stream which received the event from the source 108. Each replica of the event stream 220 receives the new event from server 120 and updates its event queue, at 1240, such that the events are in ascending order with respect to sequence number. Event stream 220 at the source also updates its event queue.

FIG. 12(b) shows steps involved in synchronizing a replica of an event stream with a reference stream. Event stream 220' receives, at step 1250, heartbeats from a clock object which is usually a coordinator object 210 or a media stream 230. The heartbeats communicate sync markers to the site which receives them. An event stream checks, at 1260, to see if the next event in its event queue has a marker that is less than or equal to the sync marker received through the heartbeat. If so, the next event is dispatched to sink data components 108' of the event stream 220' and the event queue is updated by removal of the event from the top of the queue.

As depicted in FIG. 1, the server 120, which can be either a client machine running the server or a dedicated server machine, maintains a set of stream objects 160, one for each event stream (described in more detail with reference to FIG. 4). Each stream object 160 includes the following: an event buffer 161 to store events which are used to initialize a late comer in a collaboration; an event sequence generator 162 to generate sequence numbers for the events in the event stream; a list of registered clients 163 collaborating using the specific event stream; and, an event distributor 164 which is responsible for distributing events to the registered clients.

As depicted, each client site, 100 and 170, includes an operating system layer 101 and 101', a middleware layer 102 and 102', and an application layer 103 and 103'. The operating system layer can be any available computer operating system such as AX, Windows 95, Windows NT, SUN OS, Solaris, and MVS. The middleware layer implements domain specific system infrastructures on which applications can be developed. Multimedia Collaborative Client (MMCC) 110, the client side of the system (described in more detail in FIG. 2), belongs to the middleware layer. Each site's application layer includes collaborative data component(s) 108 and media component(s) 109 grouped together inside collaboration spaces 105. A collaborative application may be developed by integrating a number of data components 108 such as chat, whiteboard and foil viewer, and a number of media components 109 such as audio and video encoders as well as players. A collaboration space 105 supports coordination and synchronization of a set of such components in a collaborative application. A collaboration space can be configured so that the set of components is customizable to match an user's preferences and the capabilities of his/her computer 100, 170.

As depicted, the reflector 180 manages the distribution of audio and video streams to the various clients 100, 170 in the network 113. Clients 100, 170 may join an ongoing collaboration at any point in the session. The reflector 180 maintains a circular buffer 181 of the most recent several seconds in the session and an open TCP connection for each client 100, 170.

The system described in this invention has been implemented on a variety of network platforms 113. For example, a local area setup uses RS/6000* (running AIX*), and Personal Computers (running Windows 95*) as clients 100, 170 connected to high end RS/6000 machines as server 120 and reflector 180 using 16 MB token ring network. A wide area setup uses Sun Ultra 1* as clients 100, 170 and SUN SPARCSTATION* 20 as the server 120, a high end RS/6000machine as reflector 180 connected via the Internet. (*Trademarks of respective owners).

Figure 2:
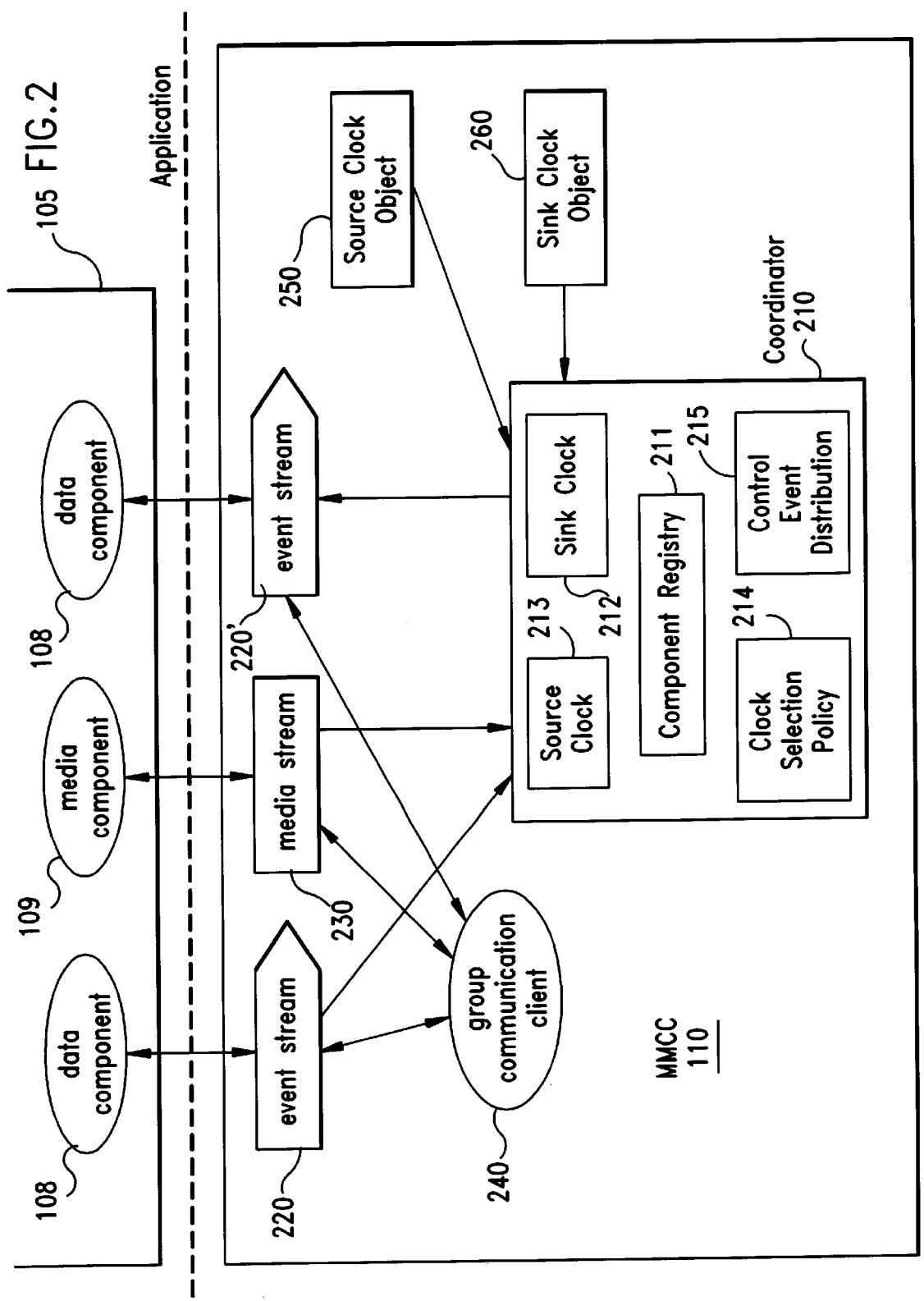
FIG. 2 depicts a schematic representation of multimedia collaborative client middleware.

FIG. 2 depicts the components of a Multimedia Collaborative Client (MMCC) 110. Media streams 230 are continuous and periodic streams used to develop shared media components 109. Similar to media streams 230, an abstraction called an event stream 220, a discrete and aperiodic stream of events, is used to develop shared data components 108 in a collaboration space 105. Each data component 108 may generate and receive events of a type which is specific to the component 108.

A clock object 250, 260 (which can potentially be a media stream 230) provides clock tick notification service to the components 108, 108' and 109 in a collaboration space 105. MMCC provides two kinds of clock objects: a source-clock object 250 and a sink-clock object 260. A source data component 108 uses the time provided by the source-clock 250 to time stamp the events it generates. Similarly, a sink data component 108' triggers a reaction for a received event at a specified time of the sink-clock object 260. A sink-clock object can be either one of the shared components ,108, 108' or 109, in the collaboration space 105 or can be a default object provided by MMCC 110. For example, an audio media stream can be a sink-clock 260 for many applications requiring audio; whereas, in the absence of a media stream, the system clock can be used as a clock object 250, 260.

While the state of each shared data component 108, 108' and 109 in a collaboration space 105 is kept consistent using underlying consistency protocols, a coordinator object 210 in MMCC 110 implements the inter-component consistency required by the components in the collaboration space 105. A shared component of an application joins a collaboration space 105 by registering with coordinator 210. The coordinator 210 maintains the list of registered components in a component registry 211 (which can be any traditional data structure). To implement temporal synchronization among the components, a coordinator object 210 includes a clock selection policy 214 (discussed in more detail with reference to FIG. 13) to select a sink-clock 260 and a source-clock 250 for a collaboration space 105 from among competing objects. It is often possible that a preferred sink-clock 260 may not exist in a collaboration space 105. For example, a client 100, 170 running a collaboration space 105 may not have audio playback capability. In the absence of a media component (e.g., audio/video player), the relative ordering of events that are coming from multiple event streams can be obtained by using system clock as the sink clock object. In such a case, the coordinator implements the source clock interface 213 so that a source data component can obtain a time value to time stamp events it generates. Similarly, the coordinator 210 implements the sink clock interface 212 so that the registered components 108, 109 can receive heartbeat (or clock tick) notifications. Finally, the coordinator implements the control event distributor 215 to receive and distribute VCR-like controls events such as play, stop, and seek to the shared components in a collaboration space 105. An application can either use a coordinator 210 from a set of coordinator objects provided by MMCC 110, or it can implement a customized coordinator object to suit the inter-component consistency requirements of a collaboration space 105. The group communication client 240 is used by MMCC 110 to communicate with the server 120 over a network 113.

A clock selection policy 214 in a coordinator object 210 provides a method for programmatically selecting one of the components registered with the coordinator object to act as source clock 250 and yet another components or the same component to act as sink clock 260. FIG. 13 depicts steps involved in a simple clock selection policy. First, a list of components that implement clock interfacing is computed in step 1310. Next, a sequence of predetermined component types are searched for in order (at steps 1320, 1330, and 1340) in the list of components from step 1310. The first available component identified by the search is designated as the source clock in steps 1325. 1335 and 1345. If none of the predetermined components is found in the component list, then the system clock is designated as the source clock at step 1350. Next, another sequence of predetermined component types are searched for in order (at steps 1360 and 13700 in the list of components from step 1310. The first available component identified by the search is designated as the sink clock at steps 1365 and 1375. If none of the predetermined components is found in the component list, then the system clock is designated as the sink clock in step 1380.

Event Streams

As mentioned earlier, shared data components 108 share state using event streams 220 which are discrete streams of data in which data represent encapsulated application specific events. An event stream 220 has a unique name in the name space of a collaborative session.

Figure 3:
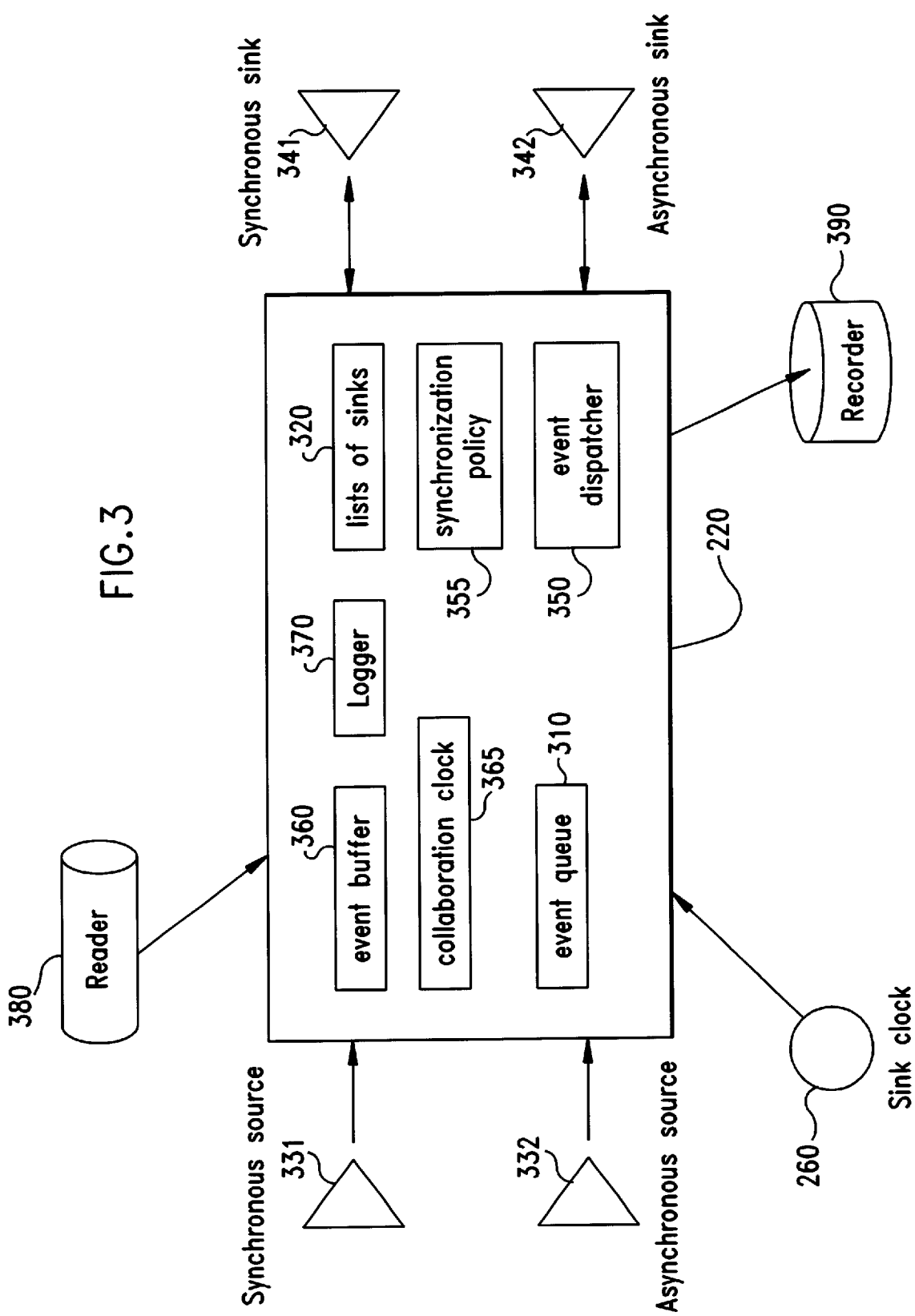
FIG. 3 depicts the structure of an event stream.

FIG. 3 depicts the components of an event stream 220. An event stream 220 contains typed events, both application dependent events (such as text events in a chat component) and system events (such as a clock initialization event which is required to initialize a sink-clock object 212). Each event has a type, a source, a time stamp, and data. A data component can receive an event from an event stream by creating an event stream or by joining a named event stream 220 and then subscribing to the events in the stream by adding itself in the list of sinks 320 maintained for that event stream. Depending on how a data component 108 interacts with its streams 220, a shared component can be classified to be a source component 331, 332 which generates and posts events to a stream, or a sink component 341, 342 which consumes events from a stream, or both. For example, a chat component can be both source 331, 332 and sink 341, 342 for a text event stream.

An event stream 220 can have a single fixed source or multiple sources which can be either synchronous or asynchronous. A synchronous source 331 provides events to the stream in real-time. Therefore, these events do not have any timing information encoded in them. The event stream attaches current time from the source clock 250 and a time stamp to the synchronous, real-time event and places it in its event queue 310 which stores events to be communicated to asynchronous sink components 108'. Unlike a synchronous source 331, an asynchronous source 332 provides time-stamped events to the stream. The event stream places these events in an event queue 310 for processing.

While subscribing for an event type, a sink component 341, 342 registers a reaction with the event stream. Two kind of sinks exist. A synchronous sink 341 is notified of an event at the earliest point at which the current time is greater than or equal to the time stamp of the event. By comparison, an asynchronous sink 342 is notified of events as soon as they arrive.

The event stream stores the time-stamped events in an event queue 310 (described in detail in FIG. 4) until it is the time to notify the synchronous sinks 341. The event stream receives clock ticks at regular intervals from a sink-clock object 260 (which may be a coordinator object 210). The event stream uses an event dispatcher 350 having its own separate thread for sending events to both synchronous and asynchronous sinks.

Figure 4:
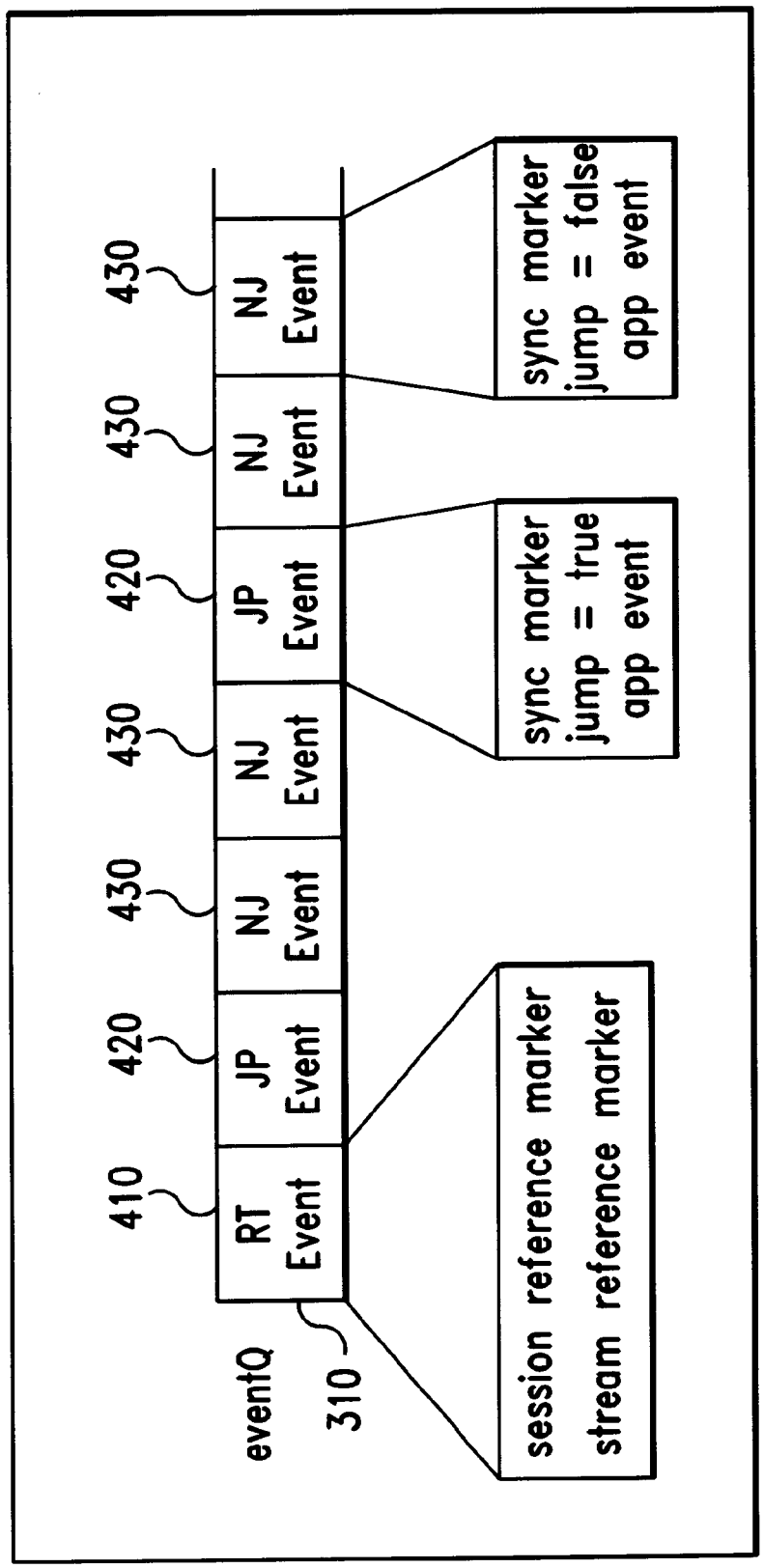
FIG. 4 depicts an example of the format of the event queue maintained by an event stream.

FIG. 4 depicts the format of an event queue 310. Since data components 108 must have the ability to jump back (for possible replay) to any point in time of a collaborative session in response to user's request, an event queue 310 maintains a history of the events 410–470 flowing in an event stream 220. However, a data component must maintain the integrity of its state after performing a jump, such that the internal state of the component should be same as if it were to reach that point without any jump. One way to guarantee the integrity is to start applying all of the events in the event stream up to the jump time in their respective order. However, applying all events is inefficient and may not be practical when the streams grow large. The event stream 220 addresses this problem by allowing components 108 to post certain special events, called JP Events 420, that have an attribute called jump-point. The significance of JP events 420 and 450 is that a data component receiving such an event does not need to receive previous events in the stream 220 to keep a valid internal state (described in more detail in FIG. 8). There are two other kinds of events in an event queue 310: NJ Events 430, 440, 460 and 470 which are not jump points, and RT Events 410 which carry timing information to initialize the internal collaboration clock 365 of a stream 220. Each event stream has an independent internal collaboration clock. The stream 220 uses this clock 365 to dispatch time stamped events 420–470 to the synchronous sink components 341.

An Event Stream 220 has numerous attributes, further detailed below. Depending on the requirements of an application, a data component can select a combination of attributes for its streams. A first attribute is the shared stream. A shared event stream is fully replicated at all sites which have a data component that subscribes to the stream. When a source 331, 332 of a shared stream generates an event, the event 311 is first delivered to local sinks 341, 342, then it is multicast to other replicas. Once a replica receives an event from the network 113, it distributes it to the registered event sinks 341, 342. The lower level transport 240 of an event stream guarantees event consistency by enforcing a strict event ordering, whereby each sink component 341, 342 of an event stream 220 receives the events in the same order. When configured, a shared event stream uses the buffer 161 of a stream object 160 in the server 120 to keep its current state up to date so that a late comer 100, 170 in a collaborative session can be properly initialized.

A buffered event stream stores a local history of data events in an event buffer 360 so that data components 108 can easily seek back and forward in a collaboration. Additionally, it implements a predefined interface to support VCR Controls such as play, stop, pause and rewind.

A persistent event stream checkpoints its state either at regular interval or when an event is received using a logger 370. Depending upon the configuration of the stream, a logger 370 checkpoints the state locally at the client machine 100, 170 or remotely at a server 120. Persistent streams are used for two purposes: to record a collaborative session; and, to make a stream fault tolerant such that, after any failure, the stream can be reinitialized to a consistent state.

A sink component 341, 342 does not care if the source of an event stream 220 is another data component 108 in a remote collaboration space 105 or a file. This allows easy programming of live, playback and authoring functions in a single collaborative applications. The file containing the encoding of an event stream can reside in the file system of local 100 or a remote computer 170, 120. The MMCC 110 provides a reader object 380 which is an adapter object that decodes an encoded event stream stored in a file and acts as source 331, 332 for an event stream 220. Similarly, another adapter called recorder 390 implements encoding events 311 in an event stream 220, and storing those events to a file.

Method for Temporal Synchronization of Event Streams

Figure 5:
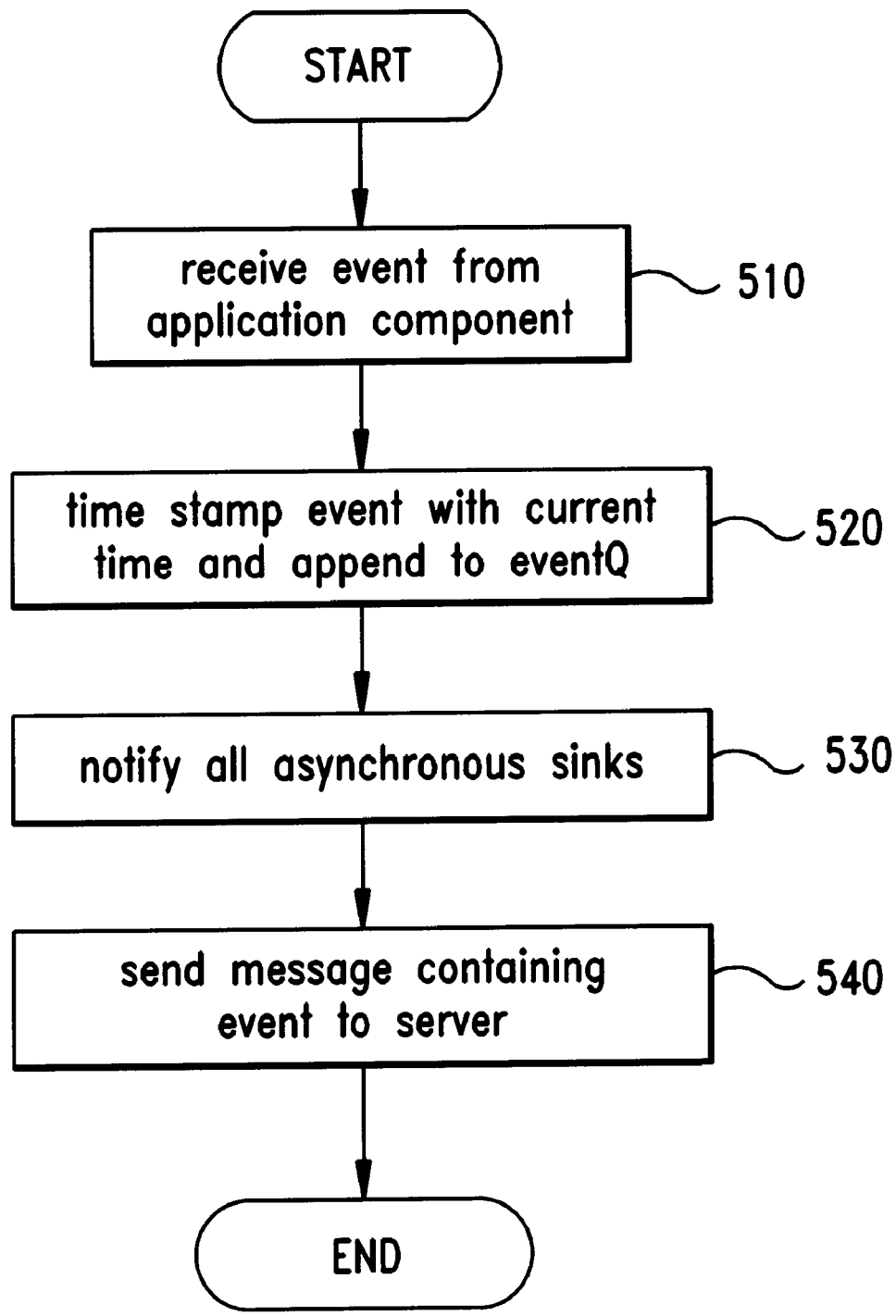
FIG. 5 depicts a flow chart for posting events to the event stream.
Figure 6:
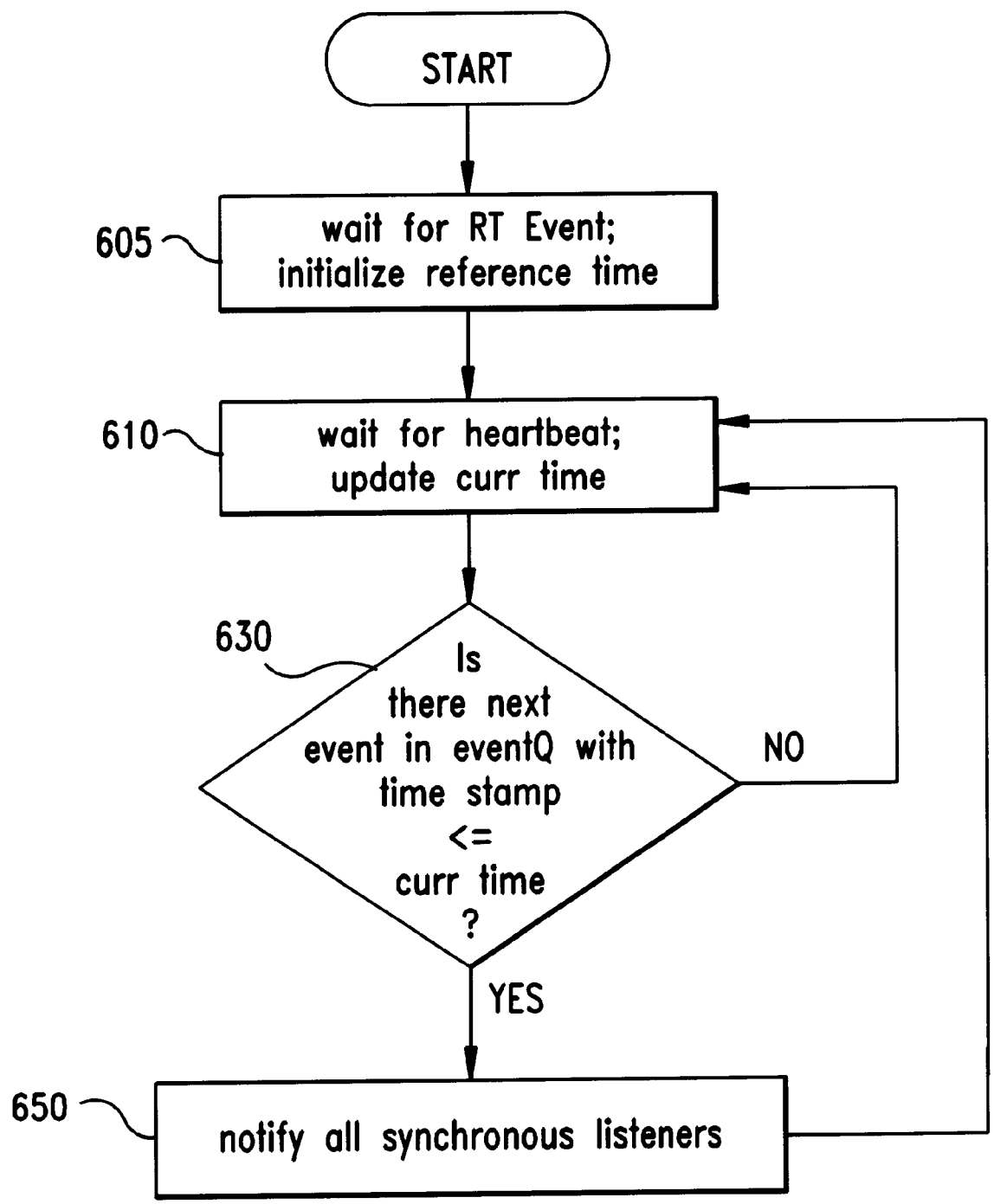
FIG. 6 depicts a flow chart for distribution of events to sink components of an event stream.
Figure 7:
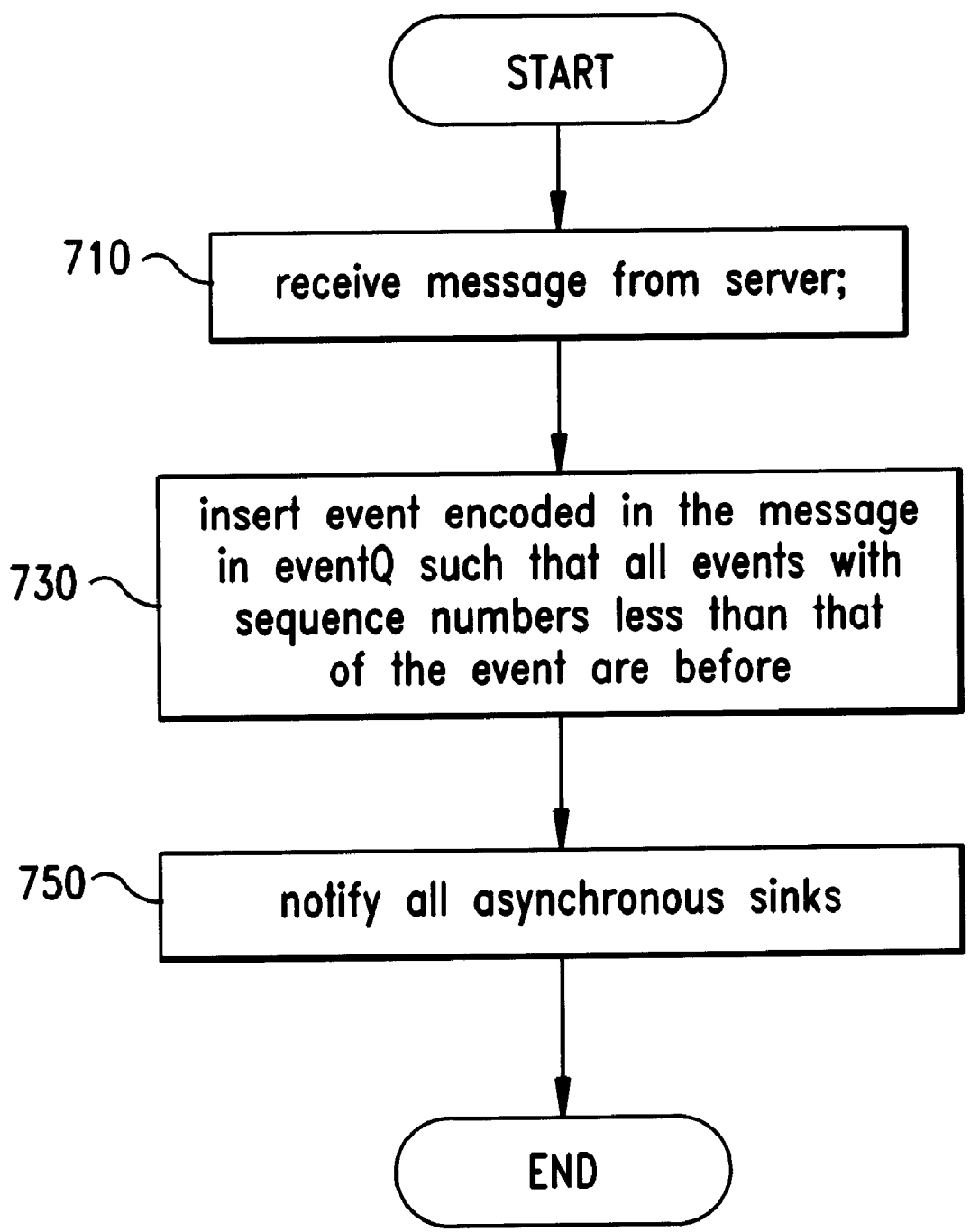
FIG. 7 depicts a flow chart for handling events received from the network.

FIGS. 5, 6 and 7 depict the method for temporal stream synchronization. Temporal synchronization is provided automatically to components 108, 109 by MMCC 110 using the combination of coordinator, event streams, and media streams. As a result, a data component 108 need not be aware of collaboration time and the underlying synchronization method. Once a collaboration space 105 is created by instantiating a coordinator object 210, the coordinator 210 selects a source-clock object 250 and a sync clock object 260 either from the components 108, 109 in the space 105, or from a set of predefined clock objects provided by MMCC 110. A data component 108', which requires synchronization with other components 108, 109 in a collaboration space 105, creates an event stream 220' and registers it in the component registry 211 of the coordinator 210 of the collaboration space 105. The coordinator 210 maintains an active thread in its sink-clock implementation 212 for notifying collaboration time to all event streams 220 registered with it. Each event stream 220 is responsible for notification of pending events (e.g., 410, 420, 430) that become available to the subscribing data components. For a shared event stream 220 that is replicated on multiple locations 100, 170, the system presented in this invention provides consistency of event order and shared state.

A data component 108 can act as a source 331, 332 of an event stream 220 by posting events to the stream 220. As depicted in FIG. 5, an event posted, at step 510, to an event stream 220 is first time-stamped, at step 520, by the event stream 220 with the current collaboration time maintained in the coordinator 210. Then, the event is delivered, in step 530, to the registered asynchronous sinks 342 of the stream 220. In addition, if the event stream is shared, the event is also sent, at 540, to the server 120 which then sends it to every replica of the stream, including the original sender.

As depicted in FIG. 7, an event received, at step 710, from the server 120 is first entered, at 730, into a pending queue of events 310 specific to an event stream 220. Events in a shared event stream 220 are ordered based on the order these events are received by the stream object 160 in the server 120. Then, the event is delivered, at 750, to the registered asynchronous sinks 342 of the stream 220. As depicted in FIG. 6, when an event stream 220 receives heartbeat (clock tick) notification from a sink-clock object 260 or the coordinator 210, it updates the collaboration clock 365 maintained by the stream 220, at update step 610. Next, the event stream 220 traverses its event queue, at step 630, to check if any event in the queue has a time stamp which is less than the time of the collaboration clock 365. If so, registered synchronous sinks 341 are notified of the event at step 650.

Method for Configuring Temporal Synchronization Policy

Figure 9:
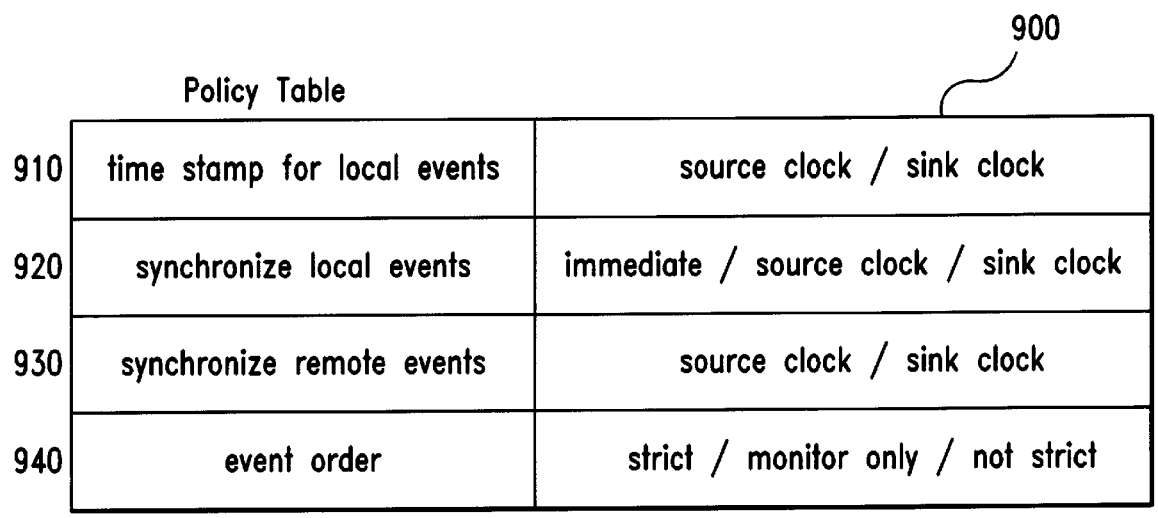
FIG. 9 illustrates a policy table for use with the present invention.

An event stream 220 has a synchronization policy 355 that is provided for configuring the policy for temporal synchronization of events 410, 420, 430, etc. Each replica 220 of a shared event stream has a policy and it is not required that all replicas 220' of a shared event stream have the identical policy 355. A replica 220' of a shared event stream that allows a local source 331, 332 to post events 410, 420, etc., can also receive events posted by a remote source 331, 332 to a remote replica 220' of the same shared event stream. A policy 355 for temporal synchronization in an event stream 220 specifies criteria for dispatching events posted by local sources 331, 332 and remote sources 331, 332. FIG. 9 shows a table containing policy configuration data. A user's computer 100, 170 may have a media component 109, 109' that is a source of a media stream 230 and may have another media component 109 that is a sink of another media stream 230. Therefore, the source clock 213 and sink clock 212 can be different in a user's computer 100, 170. The policy table 900 specifies, at 910, the clock for getting the current time for assigning time stamps to events posted by a local source 331. The policy table also, at 920, specifies the clock for temporal dispatch of events posted by a local source 331 to local sinks 341. Further, the policy table specifies, at 930, the clock for temporal dispatch of events posted by a remote source 331 to local sinks 341. Finally, at 940, the policy table specifies the event order required by the components 108, 109 in an application. Some applications require strict event order whereas some others can tolerate infrequent out of order events. Still other applications require notification of out of order events that the event stream 220 must monitor. Instead of fixing a set policy 355, the method for configuring a policy 355 supports implementation of a model for synchronization that is suited for a given application.

Method for Seeking in an Event Stream

Figure 8:
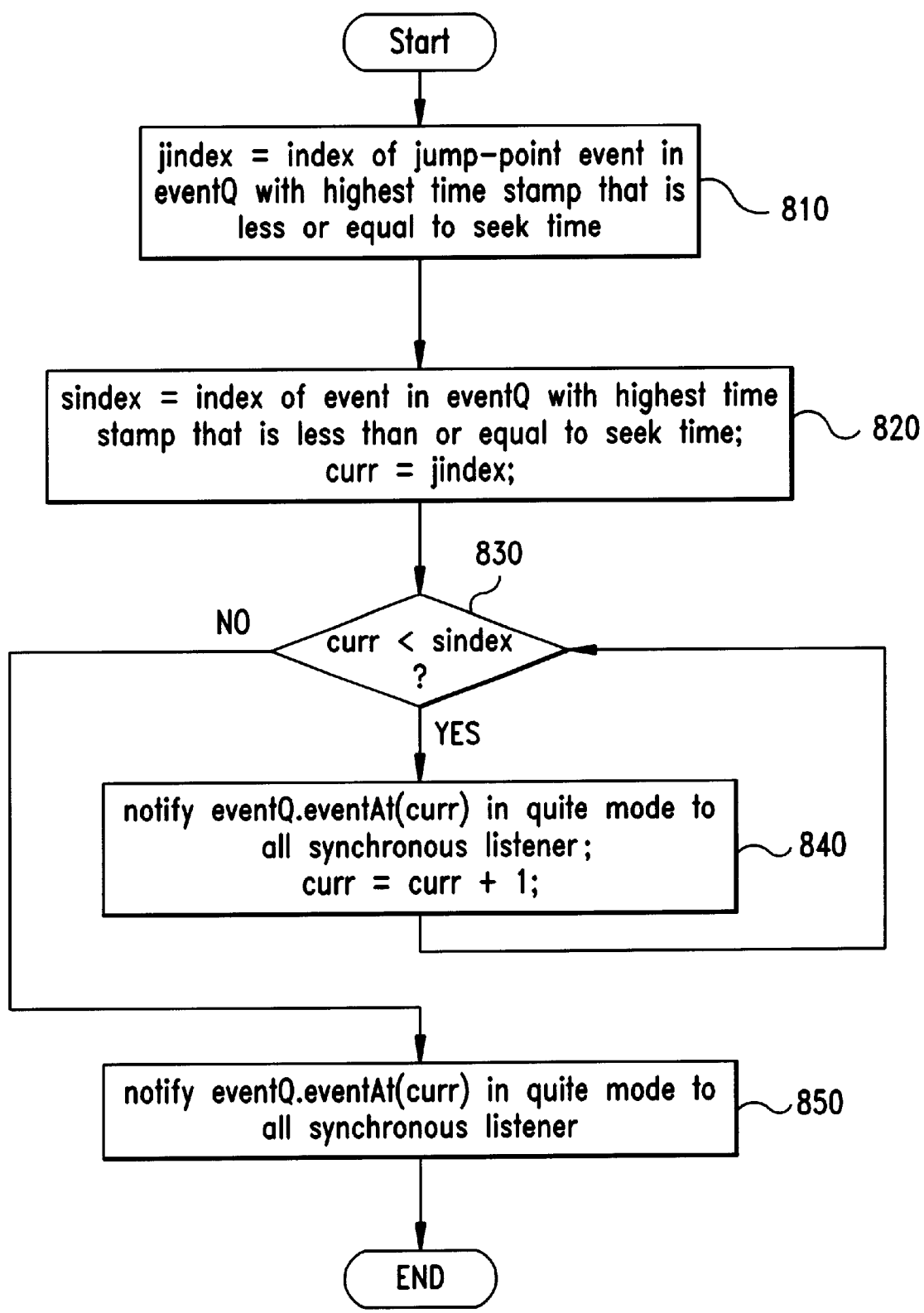
FIG. 8 depicts a flow chart for seeking back in an event stream.

Since data components 108 must have the ability to, in response to a user's request, seek to an arbitrary point in time of a collaborative session, an event queue 310 maintains a history of the events 410–470 flowing in an event stream 220. However, a data component 108 must maintain the integrity of its state after performing such a seek operation. The state of a data component 108 should be the same if it were to reach that point in time in the normal course of a collaborative session that did not have any seek operations or if seek and replay occurred. One way to guarantee this is to start applying in order all events 410–470 in an event stream 220 with a time stamp less than the seek time. However, this is inefficient especially when an event stream has large number of events in its event queue 310. FIG. 8 depicts an efficient method for seeking which addresses the problem mentioned above. Event stream 220 and data component 108 together implement a seek operation. In response to a requested seek operation, an event stream 220 first finds, at 810, the index for the latest JP event 420 in its event queue 310 with a time stamp less than or equal to the seek time. Events can be given one of two attributes, namely "quite" and "show" that have special significance in the receiving data components 108, 108'. The "show" attribute suggests to the data component that its state is updated as a result of a seek operation and that it is time to update its interface based on the internal state. The "quite" attribute suggests to the data component 108, 108' that it can update its state without rendering the updates at the user interface. The system traverses the event queue, at step 830, starting from jindex to sindex-1 and dispatches 840 events 420, 430 with "quite" mode attribute to the interested components 108. Finally, at 850, it dispatches events 420, 430 at index sindex with "show" attribute to the interested components 108. The latter events are given "show" attribute.

It should be apparent to those skilled in the art that changes can be made in the details and arrangement of components and steps without departing from the spirit and scope of the invention as set forth in the appended claims.

Having thus described the invention, what is desired to be secured by letters patent is the following:

1. A system for providing collaboration among a multi-user distributed computing environment comprising:

a local client computer having first collaboration space comprising at least one first stream;

a plurality of remote client computers each having remote collaboration space comprising a replica of said at least one first stream;

at least one server for serving said local and said plurality of remote client computers, said serving comprising handling of information relating to said at least one first stream among said at least one local and said plurality of remote client computers; and network means connecting said at least one server and said client computers.

2. The system of claim 1 wherein said at least one first stream comprises at least one event stream.

3. The system of claim 2 wherein said server further comprises at least one stream object for serving said at least one event stream.

4. The system of claim 2 further comprising at least one media stream.

5. The system of claim 4 further comprising a reflector server for serving said at least one media stream.

6. The system of claim 3 wherein said at least one stream object comprises:

at least one event buffer;

at least one event sequence generator;

registry list of associated client computers; and event distributor means.

7. The system of claim 4 wherein said each of said client computers comprises: operating system layer; middleware layer; and application layer, and wherein said application layer comprises at least said collaboration space having data components and media components.

8. The system of claim 7 wherein said middleware layer comprises multimedia collaborative client component comprising at least said event stream, said media stream and coordinator means.

9. The system of claim 8 wherein said coordinator means comprises at least one clock object and component registry.

10. The system of claim 9 wherein said at least one clock object comprises a source clock object and a sink clock object.

11. The system of claim 11 further comprising a client clock selection policy at said client coordinator.

12. The system of claim 8 wherein said coordinator means comprises at least one control event distributor to receive and distribute a plurality of control events.

13. The system of claim 5 wherein said reflector comprises at least one buffer and network connection means for each client.

14. The system of claim 7 wherein each of said client computers additionally comprises an event queue for queuing said event streams.

15. A method for providing for collaboration among users at client computers, each of said client computers having at least one data component, on a client-server network having at least one local client computer, a plurality of remote client computers and at least one server for serving said at least one local client computer and said Plurality of remote client computers by handling information relating to said at least one first stream among said at least one local and said plurality of remote client computers comprising the steps of:

creating an event stream at a first data component on a first of said client computers; and providing said event stream to a first server for said server to handle said event stream among said at least one local and said plurality of remote client computers.

16. The method of claim 15 wherein said creating said event stream further comprises specifying if said event stream is to be shared and wherein said first server creates a stream object for said event stream.

17. The method of claim 16 further comprising at least one of said data components on a requesting one of said at least one of said remote client computers requesting a replica of said event stream and wherein said server replicates said event stream.

18. The method of claim 17 wherein said replicating comprises the steps of:

said stream object sending the current state of the event stream, comprising said replica, to said requesting client computer;

said stream object registering said replica for update notification;

creating an event stream replica at said requesting client computer; and initializing an event queue at said requesting client computer.

19. In a client server system comprising at least one first local client computer having an event stream replicated in at least one event stream replica located in at least one remote client computer, each of said client computers having at least one data component and an event queue and being associated with at least one server having a stream object associated to said event stream, a method for posting an event from said event stream comprising the steps of:

said event stream attaching a sync marker to said event;

said event stream sending said event and said sync marker to said stream object on said at least one server;

said stream object attaching a sequence number to said event; and said stream object multicasting said event to said at least one event stream replica.

20. The method of claim 19 further comprising receiving said event at said at least one event stream replica and updating said event queue using said sequence number.

21. The method of claim 19 further comprising synchronizing said at least one event stream replica to said event stream.

22. In a client server system comprising at least one first local client computer having an event stream replicated in at least one event stream replica located in at least one remote client computer, each of said client computers having at least one data component and an event queue and being associated with at least one server having a stream object associated to said event stream, a method for updating said event stream comprising the steps of:

said at least one first local client computer communicating updated event stream to said stream object; and said server communicating said update to each of said at least one event stream replica.

23. The method of claim 22 wherein at least one of said client computers comprises at least one media stream and at least one other of said client computers has at least one media stream replica, and wherein said system further comprise at least one reflector server, a method for updating said media stream comprising the steps of:

said at least one client computer updating said media stream;

said at least one client computer communicating said updated media stream to said reflector server; and said reflector server multicasting said updated media stream to said at least one media stream replica.

* * * * *